US005760124A

United States Patent [19]
Listigovers et al.

[11] Patent Number: 5,760,124
[45] Date of Patent: Jun. 2, 1998

[54] INK COMPOSITIONS

[75] Inventors: Nancy A. Listigovers, Oakville;
Fatima M. Pontes, Mississauga;
Marcel P. Breton, Mississauga;
Gordon K. Hamer, Mississauga, all of Canada

[73] Assignee: Xerox Corporation, Stamford, Conn.

[21] Appl. No.: 664,693

[22] Filed: Jun. 17, 1996

[51] Int. Cl.$^6$ .................. C08L 53/00; C09D 11/10
[52] U.S. Cl. ............. 524/505; 523/161; 106/31.13; 106/31.6
[58] Field of Search ............ 106/31.6; 523/161; 524/505

[56] References Cited

U.S. PATENT DOCUMENTS

| 4,840,674 | 6/1989 | Schwarz ................ 106/22 |
| 5,207,825 | 5/1993 | Schwarz, Jr. ........... 106/22 R |
| 5,223,026 | 6/1993 | Schwarz, Jr. ........... 106/20 D |
| 5,384,223 | 1/1995 | Listigovers et al. ..... 430/59 |

*Primary Examiner*—Tae Yoon
*Attorney, Agent, or Firm*—E. D. Palazzo

[57] ABSTRACT

An aqueous ink jet ink composition comprising pigment, water, and an ($A_n$-$B_m$) block copolymer wherein n represents the degree of polymerization of A and m represents the degree of polymerization of B, wherein A is styrene, and B is acrylic acid.

20 Claims, No Drawings

INK COMPOSITIONS

BACKGROUND OF THE INVENTION

The present invention is generally directed to aqueous ink compositions. More specifically, the present invention is directed to pigmented aqueous ink compositions particularly suitable for use in ink jet printing processes, and especially thermal ink jet processes. In embodiments, the present invention relates to ink jet inks with certain copolymers as dispersants and stabilizers for the pigment, such as carbon black selected for the ink. With the ink compositions of the present invention, the stability of the inks is improved and the settling of ink components is avoided, or minimized. Moreover, the inks of the present invention in embodiments enable ink prints of excellent resolution, acceptable density, excellent waterfastness, minimum or very low showthrough, and excellent MFLEN (mid-frequency line edge noise, or edge acuity).

Ink jet printing can be considered a nonimpact method that produces droplets of ink that are deposited on a substrate, such as paper or transparent film, in response to an electronic digital signal. Thermal or bubble jet drop-on-demand ink jet printers have found broad application as output for personal computers in the office and the home.

In existing thermal ink jet printing, the printhead typically comprises one or more ink jet ejectors, such as disclosed in U.S. Pat. No. 4,463,359, the disclosure of which is totally incorporated herein by reference, each ejector including a channel communicating with an ink supply chamber, or manifold at one end and having an opening at the opposite end, referred to as a nozzle. A thermal energy generator, usually a resistor, is located in each of the channels, a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. This is a very temporary phenomenon, and the ink is quickly propelled toward a print sheet. As the bubble begins to collapse, the ink still in the channel between the nozzle and bubble starts to move towards the collapsing bubble, causing a volumetric contraction of the ink at the nozzle and resulting in the separation from the nozzle of the bulging ink as a droplet. The feed of additional ink provides the momentum and velocity for propelling the droplet toward a print sheet, such as a piece of paper. Since the droplet of ink is emitted only when the resistor is actuated, this type of thermal ink jet printing is known as "drop-on-demand" printing. Other types of ink jet printing, such as continuous-stream or acoustic, are also known.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some types of apparatus, a relatively small printhead moves across a print sheet numerous times in swathes, much like a typewriter. Alternatively, a printhead which consists of an array of ejectors and extends the full width of the print sheet may be passed once down the print sheet to give full-page images in what is known as a "full-width array" (FWA) printer. When the printhead and the print sheet are moved relative to each other, imagewise digital data is used to selectively activate the thermal energy generators in the printhead over time so that the desired image will be created on the print sheet.

With the demand for higher resolution printers, the nozzles in ink jet printers are decreasing in size. Nozzle openings are typically about 50 to 80 micrometers in width or diameter for 300 spi printers. With the advent of 600 spi printers, these nozzle openings are typically about 10 to about 40 micrometers in width or diameter. These small dimensions require inks that do not plug the small openings.

Therefore, an important requirement for ink jet ink is the ability of the ink to be stable with minimal or no settling, and the ability of the ink to remain in a fluid condition in a printhead opening on exposure to air. This allows a printhead to function after a period of nonuse, i.e. a latency, or during operation of infrequently utilized nozzles. A major concern with all ink jet printers is pluggage or clogging of nozzles during operation and between operations. This is caused by evaporation of an organic solvent or water from the opening of the nozzle. In dye-based inks, this can cause crystallization or precipitation of soluble components such as dye or solid additives. In pigment based inks, this evaporation can cause settling of the dispersion, flocculation or aggregation of the pigment dispersion, or precipitation of solid additives. Initial evaporation generally causes an increase in viscosity which affects the ability of the nozzle to fire a drop of ink. Additives have been developed which reduce the rate of evaporation from the ink. However, these additives do not totally eliminate the problem of evaporation from the ink, and thus, clogging of the nozzles remains a problem, especially with regard to pigment based inks. These and other disadvantages are avoided or minimized with the inks of the present invention.

Another important measured property for an ink jet ink is the latency or decap time, which is the length of time over which an ink remains fluid in a printhead opening or nozzle when exposed to air and, therefore, capable of firing a drop of ink at its intended target. Latency is the maximum idling times allowed for ink to be jetted by a printer with a speed equal to or greater than 5 m/s (equivalent to an ink travelling a distance of 0.5 millimeter in less than 100 ps) without a failure. This test is run with the printhead or nozzles uncovered or decapped and generally at a relative humidity of 15 percent. The time interval is the longest length of time that the printhead, uncovered, will still fire a specified drop without drop displacement or loss of density. The longer the latency time rating, the more desirable the ink. The inks of the present invention possess many of these characteristics in embodiments thereof.

Also, a further important requirement for ink jet inks, especially for pigment, such as carbon black, based inks, is for the pigment dispersion to remain stable throughout the life of the ink jet cartridge. Dye-based ink jet inks suffer from deficiencies in waterfastness, smear resistance and lightfastness after being printed on various substrates. Pigments provide an image, on a wide variety of substrates, having high optical density with high waterfastness, smear resistance and lightfastness. Therefore, pigments are a preferred alternative to dyes, provided the pigment dispersions can be made stable to prevent flocculation and/or aggregation and settling. Some cosolvents that are good as clogging inhibitors cause destablization of pigment dispersions and, therefore, cannot be used in pigmented inks. With the inks of the present invention, and the primary flocs of the present invention there are provided stable inks for extended time periods of, for example, up to 100,000 prints it is believed. More specifically, it is believed that inks of the present invention in embodiments thereof will be stable for extended time periods of, for example, up to 100,000 developed prints.

Substantial effort has been expended in attempts to provide ink jet inks having high pigment and/or dye loading with acceptable latency and stability. However, inks with the above-mentioned desirable characteristics are not believed to be known.

Moreover, certain ink jet printers require ink jet inks having higher loading of pigments to provide sufficient optical density in a single pass, i.e. without applying additional ink to the substrate or paper. Additionally, certain ink jet printers are designed to provide enhanced resolution such as, for example, a printer capable of providing 600 spots per inch (spi) as compared to the currently used 300 spi printers. These devices require refined inks that do not cause clogging or plugging of the ink jet nozzles, which are significantly narrower than those of 300 spi printers. In particular, nozzle openings are typically about 50 to 80 microns in channel width or diameter for 300 spi printers and about 10 to 40 microns in channel width or diameter for 600 spi printers. These and other disadvantages are eliminated, or minimized with the inks of the present invention, and more specifically, the inks of the present invention possess improved maintainability characteristics. Improved maintainability allows clogged nozzles to be easily recovered upon capping at 100 percent humidity.

U.S. Pat. No. 4,840,674, the disclosure of which is totally incorporated herein by reference, describes an ink jet ink having sulfolane in combination with dyes and other ink additives without pigments. Similar disclosures are presented in a number of ink jet ink patents and publications.

Efforts to increase pigment loading of ink jet inks using commercial pigments and pigment dispersions have resulted in inks having undesirable instability (increased aggregation or flocculation). Moreover, the decap time or latency of such inks is extremely low (less than 10 seconds at 15 percent humidity). Accordingly, such inks are not suitable for ink jet printers.

There is thus a need for aqueous ink compositions that can be utilized in high resolution ink jet printers. Additionally, there is a need for pigmented inks that provide high latency and also remain stable throughout the life of the ink jet cartridge. There is also a need for pigmented inks that provide high optical density in a single application or pass. These and other needs are achievable with the inks and processes of the present invention in embodiments thereof.

SUMMARY OF THE INVENTION

The present invention relates to an aqueous ink jet ink composition comprising water, a pigment dispersion including pigment particles, and which particles in embodiments having a particle size distribution where at least 70 percent of the particles have a diameter below about 0.1 micron with the remaining particles in the dispersion having a diameter less than or equal to 1 micron, and certain diblock copolymers. More specifically, the inks of the present invention are comprised of a major amount of water, pigment particles, especially carbon black, and A-B diblock copolymers wherein the A block binds to the pigment surface, and the B block functions as an electrosteric stabilizer to prevent reflocculation of the pigment after dispersion thereof. Also, the present invention relates to a high resolution printing process comprising applying the ink composition in imagewise fashion to a substrate. The invention ink in embodiments possesses a latency of at least 20 seconds, at 15 percent relative humidity, in a printer having at least one nozzle of a channel width or diameter ranging from 10 to about 40 microns.

Embodiments of the present invention include an aqueous ink jet ink composition comprising pigment, water, and an ($A_n$-$B_m$) block copolymer wherein n represents the degree of polymerization of A and m represents the degree of polymerization of B, wherein A is styrene, and B is acrylic acid; an ink wherein the degree of polymerization for A is from about 5 to about 50 and preferably 10 to 20, and the degree of polymerization for B is from about 70 to about 800, and preferably 150 to 300; wherein n is a number of from between about 5 to about 50, and A represents the anchoring block for said pigments, and B represents the block that functions primarily as a steric stabilizer, and wherein m is a number of from between about 70 to about 800.

DETAILED DESCRIPTION OF EMBODIMENTS

Aqueous ink compositions according to the present invention provide numerous advantages including excellent waterfastness, lightfastness, low product cost, high image resolution, excellent print quality on a variety of substrates, excellent jetting capability with high drop velocity, longer latency, larger drop mass or drop volume, which provides optimal optical density in a single pass, high frequency response which allows for high speed printing, excellent printhead recoverability and maintainability, excellent ink stability, minimal ink and pigment settling, and a lack of printhead kogation, that is solid formation on heaters.

Examples of liquid vehicles selected for the invention inks include water, a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, or other water miscible components, and mixtures thereof.

When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside these ranges. The nonwater component of the liquid vehicle generally serves as a humectant which has a boiling point higher than that of water (100° C.). The pigment dispersion can be mixed with different humectants or solvents including ethyleneglycol, diethyleneglycol, propyleneglycol, dipropylene glycol, polyethyleneglycols, polypropylene glycols, glycerine, trimethylolpropane, 1,5 pentanediols, 1,6 hexanediols, diols, and triols containing from about 2 to about 10 carbons, sulfoxides such as dimethylsulfoxide, alkylphenyl sulfoxides, and the like, sulfones such as sulfolane, dialkyl sulfones, alkyl phenyl sulfones, and the like, amides such as N,N-dialkyl amides, N,N-alkyl phenyl amides, N-methylpyrrolidinone, N-cyclohexylpyrrolidinone, N,N-diethyltoluamide, and the like, ethers such as alkyl ether derivatives of alcohol, etherdiols, and ethertriols including butylcarbitol, alkyl polyethyleneglycols, and the like, urea, betaine, and the thio (sulfur) derivatives of the aforementioned components, such as thioethyleneglycol, trithioethyleneglycol, and the like. Desired known penetrants, surfactants, water soluble polymers, pH buffer, biocides, chelating agents such as EDTA and the like, and optional additives can also be selected for the invention inks. The liquid vehicle is generally present in an amount of from about 50 to about 99.5 percent by weight, preferably about 85 to about 98 percent by weight, and more preferably from about 90 to about 96 percent by weight, although the amounts may be outside these ranges.

According to the present invention, in embodiments A-B diblock copolymers can be selected primarily for ink stabilization purposes. These copolymers contain an A segment with pigment, and more specifically, carbon black affinity, and wherein the A block is of a certain length, for example a degree of polymerization of from about 3 to about 15 units, and of a certain composition to enable the A block to bind to the pigment surface, and the B block is as indicated herein. The A block, for example polystyrene, can comprise in embodiments from about 5 to about 15 percent by weight of the block copolymer, and the remainder is the B block, which is water soluble and can be a poly(carboxylic acid).

Examples of A-B block copolymers selected for the inks of the present invention include those wherein the A block is polystyrene, poly(alkylstyrenes), polybutadiene, and wherein the B block is comprised of polysulfonates, polyphosphates, poly(quaternary ammonium salts), poly (pyridinium salts), polycarboxylates, and polyphenoxides. Examples of block copolymers include polystyrene-b-poly (acrylic acid) of the formula $(A_n-B_m)$, wherein A is the anchoring block, B is the steric stabilizing block, and n and m represent the degree of polymerization which is the number of monomer units contained in a polymer chain. Since there is variation from chain to chain, an average degree is usually recited and it is directly related to the number average molecular weight. This is a simple arithmetic average. The degree of polymerization and $M_n$ are related and can be calculated in accordance with the following:

DP=#mol of monomer÷#mol of initiator $M_n$=#grams of monomer÷#mol of initiator=DP X formula weight of the monomer.

The degree of polymerization of A is, for example, a number of from about 5 to about 50, and examples of A include polystyrene, polybutadiene, polyvinylpyridine, polyisoprene, poly(alkyl styrene) and copolymers thereof. For A-B, m represents the degree of polymerization of B, and can be a number of from about 70 to about 800 like poly(acrylic acid) with compositional ratios of the polystyrene to poly(acrylic acid) in the range of from about 2/98 to about 30/70, and more preferably in the range of from about 8/92 to about 20/80. These copolymers possess in embodiments number average molecular weights (Mn) in the range of from about 5,000 to about 100,000 with the preferred range being from about 8,000 to about 50,000. Specific examples of block copolymers include polystyrene-b-poly (acrylic acid), and more specifically, polystyrene-b-poly (acrylic acid), preferably with a degree of polymerization of from about 100 to 400 in embodiments, and more preferably of from about 150 to about 300. Alternative anchoring blocks to polystyrene include poly(alkyl styrene), polybutadiene, polyisoprene, poly(4-vinylbiphenyl), and copolymers thereof. Alternative steric stabilizing blocks to poly(acrylic acid) include poly(methacrylic acid), poly(4-vinylbenzoate), poly(4-vinylpyridinium), poly(2-vinylpyridinium), poly(styrene sulfonate), poly(4-vinyl phenoxide), and poly[2-(trimethylammonium)ethyl acrylate]. The AB block copolymers are selected in various effective amounts, such as from about 5 to about 50, and preferably from about 15 to about 40 weight percent on carbon black.

The block copolymers can be synthesized by anionic polymerization, reference the processes as illustrated in R. Fayt, R. Forte, C. Jacobs, R. Jerome, T. Ouhadi, Ph. Teyssie, and S. K. Varshney, *Macromolecules*, Vol. 20, No. 6, pages 1442–1444 (1987), the disclosure of which is totally incorporated herein by reference. For example, anionic polymerization of polystyrene-b-poly(t-butyl acrylate) can be accomplished at a temperature of from about −10° C. to about −78° C. in solvents like tetrahydrofuran (THF) by initiation of styrene monomer with the α-methylstyryl anion generated from α-methylstyrene and a component like n-butyllithium (n-BuLi). The reaction is essentially instantaneous to yield the polystyrene anchoring block with number average molecular weights which are easily calculated from the ratio of the total weight of monomer to the number of moles of initiator, and are as indicated herein. The living polystyryl anions are then further reacted with t-butyl acrylate monomer, which is used as a protected form of acrylic acid, to provide the desired B block with little or no increase in polydispersity. The reaction is quenched with degassed methanol, and the mixture is precipitated directly into a methanol/water mixture. After filtering and vacuum drying, the block copolymer is obtained as a white powder in 96 percent yield. Measurement of the molecular weight by GPC versus polystyrene standards is not appropriate for poly(t-butyl acrylate), and therefore, the length of the B block will be described in terms of degree of the polymerization, i.e. the number of monomer units in the chain. In anionic polymerization where termination is absent, the degree of polymerization of each block can be calculated from the ratio of the number of moles of monomer to the number of moles of initiator. One typical polystyrene-b-poly(acrylic acid) copolymer contains 9 mole percent of polystyrene and 91 mole percent of poly(acrylic acid), as determined by $^1$H NMR, and has a degree of polymerization of 180 monomer units. Copolymers with narrow polydispersities, such as for example a molecular weight distribution $(M_w/M_n)$ of less than about 1.2, can be selected. Composition and degree of polymerization of the copolymers can be controlled and determined by the weight of monomers used in the reaction, and the stoichiometric ratio of the initiator to the styrene and t-butyl acrylate monomers. For example, when 1 millimol of initiator is used to polymerize 1 mole of monomer, then the degree of polymerization will be in the range of 1,000.

The colorant for the ink compositions of the present invention is preferably a pigment, or a mixture of one or more pigments. The pigment can be black, cyan, magenta, yellow, red, blue, green, brown, mixtures thereof, and the like, and is preferably carbon black, such as Raven 5750 carbon black obtained from Columbia Chemicals Company. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido) phthalocyanine, X-copper phthalocyanine pigment, listed in the color index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Paliogen Violet 5100 (BASF) as CI Pigment Violet 19. Paliogen Violet 5890 (BASF), Permanent Violet VT2645 (Paul Uhlich), Heliogen Green L8730 (BASF) as CI Pigment Green 7, Argyle Green XP-1 11-S (Paul Uhlich), Brilliant Green Toner GR 0991 (Paul Uhlich) as Pigment Green 1, Heliogen Blue L6900 as CI Pigment Blue 15:1, L7020 (BASF) as CI Pigment Blue 15:3, Heliogen Blue D6840 as CI Pigment Blue 15, D7080 (BASF) as CI Pigment Blue 15:3, Sudan Blue OS (BASF), PV Fast Blue B2GO1 (American Hoechst) as CI Pigment Blue 15:3, Irgalite Blue BCA (Ciba-Geigy), Paliogen Blue 6470 (BASF) as CI Pigment Blue 60, Sudan III (Matheson, Coleman, Bell) as CI Solvent Red 23, Sudan II (Matheson, Coleman, Bell) as Solvent Red 7, Sudan IV (Matheson, Coleman, Bell) as Solvent Red 24, Sudan Orange G (Aldrich), Sudan Orange 220 (BASF), Paliogen Orange 3040 (BASF) as CI Pigment Orange 52, Ortho Orange OR 2673 (Paul Uhlich) as CI Pigment Orange 2, Paliogen Yellow 152,1560 (BASF) as Pigment Yellow 108, Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Sico-Gelb L1250 (BASF), Sico-Yellow D1357 (BASF) as CI Pigment Yellow 13, Hostaperm Pink E (American Hoechst), Fanal Pink D4830 (BASF) as CI Pigment Red 51, Cinquasia Magenta (DuPont), Lithol Scarlet D3700 (BASF) as CI Pigment Red 48: 1, Toluidine Red (Aldrich) as CI Pigment Red 3, Scarlet for Thermoplast NSD PS PA (Ugine Kuhlmann of Canada), E. D. Toluidine Red (Aldrich), Lithol Rubine Toner (Paul Uhlich) as CI Pigment Red 57: 1, Lithol Scarlet 4460 (BASF) as CI Pigment Red 48:2, Bon Red C (Dominion Color Company), Royal Brilliant Red RD-8192 (Paul Uhlich), Oracet Pink RF (Ciba-Geigy), Paliogen Red 3871 K (BASF) as CI Pigment Red 123, Paliogen Red 3340 (BASF) as CI Pigment Red 226, and Lithol Fast Scarlet L4300 (BASF) as CI Pigment Red 48:4. Preferred pigments are CI Pigment Red 51, CI Pigment Red 57, CI Pigment Red 81, CI Pigment Red 169, CI Pigment Yellow 17, CI Pigment Yellow 14, CI Pigment Yellow 13, CI Pigment Blue 15, CI Pigment Blue 60, and CI Solvent Blue 70.

Pigment dispersions selected can be prepared by mixing the pigment and AB diblock copolymer with water, and other optional additives. The pigments may include those indicated herein, such as Hostaperm Pink, CI Pigment Red 9, 146 and 184 Phthalocyanine (CI Pigment Blue 15, 15:4, and the like), metal phthalocyanine derivatives (copper phthalocyanine and its derivatives, vanadyl phthalocyanine, and the like), CI Pigment Yellow 13, 17, 83, 85, etc., Direct Yellow 157, etc., and carbon blacks including Raven 5250, Raven 5000, Black Pearl L, Black Pearl 1300, REGAL 330®, Vulcan XC-72C, and the like. A preferable pigment according to the present invention is carbon black Raven 5250 available from Columbian Chemical Corporation.

Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.01 to about 3 microns, although the particle size can be outside these ranges. A more preferred pigment particle size includes particles having at least 70 percent of the particles being below 0.1 micron with no particles being greater than 1.0 micron (measured on a Hodaka CAPA 700 Particle Size Analyzer). More preferably, the pigment particle size includes particles having at least 90 percent of the particles being below 0.1 micron with no particles being greater than 1.0 micron.

The pigment is present in the ink composition in any effective amount, generally from about 1 to about 20 percent by weight, preferably from about 3 to about 10 percent by weight, more preferably from about 4 to about 9 percent by weight and most preferably from about 5 to about 8 percent, although the amount can be outside of these ranges.

Further optional additives to the inks employed in the process of the present invention include biocides, such as DOWICIL 150, 200, and 75, benzoate salts, sorbate salts, and the like, present in an amount of from 0 to about 10 percent by weight, preferably from about 0.001 to about 8 percent by weight, and more preferably from about 0.01 to about 4.0 percent by weight, although the amount can be outside these ranges, penetration control additives, such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight, although the amount can be outside these ranges, pH controlling agents such as acids, or bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges, or the like.

Other examples of suitable ink additives include those disclosed in U.S. Pat. Nos. 5,223,026 and 5,207,825, the disclosures of each of which are totally incorporated herein by reference.

In accordance with the present invention in embodiments thereof, pigment dispersions may be prepared by mixing the AB diblock copolymer, pigment, and water in a mixer such as an attritor, sandmill, homogenizer, fluidizer, high speed mixer, and the like, with or without an optional grinding medium, such as stainless steel balls, ceramic chips, and the like. Grinding time generally ranges from about 10 minutes to about 24 hours, preferably from about 20 minutes to about 8 hours, and most preferably from about 30 minutes to about 3 hours. The pigment dispersion thus obtained may be centrifuged and filtered to provide a uniform particle distribution and to remove larger particles of pigment. This centrifuge process is optional and the ink may be filtered subsequent to mixing the pigment dispersion with the other ink components.

Aqueous ink compositions may also be provided by mixing the formed inks with humectants, and other ink additives. The mixing can be done by various methods including homogenizing, sonification, microfluidization, mechanical mixing, magnetic stirring, high speed jetting, and the like. The sonification process is preferred since such process provides a homogeneous dispersion by evenly distributing the dispersant throughout the pigment dispersion.

The dispersed pigment can be selected as an ink as is, and preferably the thoroughly mixed pigment ink mixture is first centrifuged by a batch process or a continuous process utilizing commercially available equipment, such as bottle centrifuges, preparative ultracentrifuges, analytical ultracentrifuges, zonal centrifuges, tubular centrifuges, disk centrifuges, continuous conveyor-discharge centrifuges, basket centrifuges, liquid cyclones, and the like to remove large pigment particles from the ink. Centrifuging should be conducted for a time sufficient to remove large size particles and at a rate of about 4,000 to about 8,000 rpm. The continuous centrifuge process is very useful in the commercial production of large quantities of pigment ink for the separation of large pigment particles from the ink. The ink is also preferably subjected to a filtration process which utilizes various commercial filtration media including cartridges constructed from nylon, polyester, TEFLON®, polysulfone, and other suitable polymeric materials; membranes; porous ceramic media; cloth; and the like. The filter should be of a size to remove particles greater than 3 μm in size, preferably greater than 1.2 μm in size, most preferably greater than 1 μm in size. Any suitable filtration method, such as continuous and/or batch filtration methods, may be used. Continuous filtration methods are preferred for large scale production of pigment inks. Inks which have been centrifuged and filtered so as to preferably remove particles greater than 1 μm in size from the ink are suitable for use as ink jet inks because of their ability to not clog the ink jet and their long latency and jetting stability.

The surface tension of the pigment dispersions, as measured by the Wilhelmy Plate method, are in embodiments from about 40 to 72 dynes/cm$^2$, and preferably greater than 45 dynes/cm$^2$, and more preferably greater than 50 dynes/cm$^2$. Ink compositions according to the present invention possess surface tensions greater than 30 dynes/cm$^2$, preferably greater than 35 dynes/cm$^2$, and more preferably greater than 45 dynes/cm$^2$ and, for example, from about 50 to about 100. The viscosity of the ink composition, measured using a Brookfield Viscometer, is, for example, less than 8.0 cps, and greater than about 1.2 cps, preferably less than 6.0 cps, and more preferably less than 4.0 cps.

The inks of the present invention possess excellent latency as measured by ability of the jets to eject drops after the printer remains idle for the given period of time. Generally, the inks possess a latency of at least 10 seconds, more generally on the order of 20 seconds to greater than 1,000 seconds, with a minimum latency of at least about 30 seconds being preferred.

The ink may be applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox® series 10 paper, Xerox® 4024 paper, or the like, coated papers, such as those available from Jujo, transparency materials suitable for aqueous inks or ink jet printing processes, or the like.

Specific embodiments of the invention will now be described in detail. All parts and percentages are by weight, unless otherwise indicated.

SYNTHESIS OF POLYSTYRENE-B-POLY(t-BUTYL ACRYLATE) COPOLYMERS

General Experimental:

All syringes and syringe needles were dried in an oven at 125° C., and cooled in a desiccator containing calcium chloride. Tetrahydrofuran was distilled from sodium/benzophenone under an argon atmosphere. Styrene, α-methylstyrene, and 1,1-diphenylethylene were vacuum distilled from sodium hydride and stored, at 10° C., under a blanket of argon until used. t-Butyl acrylate was vacuum distilled first from calcium hydride and then from triethylaluminum and stored, at 10° C., under a blanket of argon until used. N-butyllithium, in cyclohexane, was used as received from Aldrich Chemical and titrated with diphenylacetic acid just prior to use. All reactions were accomplished with a Buchi Type 1 Autoclave fitted with a 1 liter kettle. The reaction kettle was flushed with argon gas and dried using a solution of n-butyllithium. Throughout the synthesis of the copolymer, a positive pressure of argon was maintained in the reaction kettle.

Preparation of Polystyrene-b-Poly(t-butyl acrylate) Copolymers:

Dry tetrahydrofuran (200 milliliters) was added to the reaction kettle, followed by cooling to –50° C., with a Neslab ULT-80 cooling bath. The initiator solution was prepared in a separate pot by the dropwise addition of n-butyllithium (1.5 milliliters, 1.85 molar, 2.8 millimols) to α-methylstyrene (0.45 milliliter, 3.5 millimols) in tetrahydrofuran (10 milliliters). Without delay, a portion of the deep red initiator solution (7 milliliters, 1.6 millimols) was transferred to the reaction kettle followed by styrene monomer (2.08 grams, 20 millimols). There was an immediate color change from red to orange. After 10 minutes, 1,1-diphenylethylene (0.4 milliliter, 2.3 millimols) was added. It is known that 1,1-diphenylethylene does not homopolymerize anionically, and therefore, a single unit caps each polystyryllithium chain end generating a deep red color. After an additional 15 minutes, t-butyl acrylate (26.3 grams, 205 millimols) was added to provide a pale yellow solution. The resulting mixture was stirred from 30 minutes and the reaction was quenched with degassed methanol. The polystyrene-b-poly(t-butyl acrylate) block copolymer was precipitated from the reaction mixture by slow addition into 3 liters of methanol/deionized water (5:1). The product was isolated by filtration and dried to constant weight in a vacuum oven at 60° C to provide a 96 percent yield.

Characterization of Polystyrene-b-Poly(t-butyl acrylate) Copolymers:

Polystyrene and poly(t-butyl acrylate) contents of the block copolymer were easily determined by 1H NMR. For the above described copolymer, the poly(t-butyl acrylate) and polystyrene contents were found to be 91 mole percent and 9 mole percent, respectively. The number average molecular weight of the polystyrene block, as determined by gel permeation chromatography versus polystyrene standards, was found to be 1,640 which implies a degree of polymerization of approximately 16 units for the A block. Based on this number and the mole ratio of the two blocks, the degree of polymerization of the poly(t-butyl acrylate) block is approximately 164 units.

Conversion of Polystyrene-b-poly(t-butyl acrylate) Copolymers to Polystyrene-b-poly(acrylic acid) Copolymers:

The above described polystyrene-b-poly(t-butyl acrylate) copolymer (3 grams) was dissolved in dichloromethane (100 milliliters). Trifluoroacetic acid (4 milliliters) was added slowly and the mixture was stirred overnight, about 18 hours. The solvent was removed on the rotary evaporator and the residue was dissolved in tetrahydrofuran (20 milliliters) and precipitated into hexane (600 milliliters). The poly(acrylic acid) containing copolymer was isolated by filtration and dried in a vacuum oven at 60° C. to yield 1.46 grams of a white solid. The polystyrene-b-poly(acrylic acid) copolymer was found to be completely water soluble without pH adjustment.

Characterization of Polystyrene-b-poly(acrvlic acid) Copolymers:

Poly(acrylic acid) and polystyrene contents were easily identified by $^1$H and $^{13}$C NMR and were in substantial agreement with the composition determined for the polystyrene-b-poly(t-butyl acrylate) copolymer from which it was derived.

Preparation of an Aqueous Carbon Black Dispersion using Polystyrene-b-poly(acrylic acid) as a Stabilizer:

A stable carbon black dispersion was prepared as follows. Polystyrene-b-poly(acrylic acid), (PS-b-PAA), (2.02 grams)

was weighed into a bottle and allowed to dissolve overnight, about 18 hours, in deionized water (100 grams). Raven 5750 carbon black (12.116 grams), Columbia Chemicals Company, was then added to the polymer solution. The resulting carbon black dispersion was sonicated for 10 minutes, allowed to cool for 15 minutes, and then sonicated for an additional 25 minutes using a sonicator model 350, obtained from Ultrasonic Inc., at setting 6. The dispersion was added to a Union Process attritor type 01 Standard containing 1 killigram of ⅛ inch stainless steel beads with an additional amount of water (20 grams). The attrition was performed at 25° C., pH=2 to 3, for a period of 110 minutes. The mixing speed for the attrition was selected so as to enable the formation of a small vortex at the center of the vessel, setting of about 55. After this time, additional PS-b-PAA copolymer (1.0 gram) was added to the attritor and the pH was adjusted to about 6 to 7 pH units with the addition of 1N aqueous NaOH (5.53 grams). The attrition was continued for a period of 24 hours at 25° C., followed by 2 hours at 60° C. The resulting dispersion was cooled to room temperature and diluted with water to obtain a final dispersion ("Dispersion A") containing 8.83 weight percent carbon black. "Dispersion A" was used to prepare a series of carbon black inks suitable for printing on plain papers as shown in the Examples below.

Smear Measurements: Smear is the optical density transferred to the white paper background adjacent to a black image, when it is rubbed under a given set of conditions. The level of smear was obtained by rubbing the carbon black images (1 inch square) against the wire side of the paper used to generate the images. This was done with an "Ink Rub Tester" (Testing Machine Inc.) using a 4 pound weight and rubbing 50 times at 85 cycles/minute. The optical density transferred to the background next to the printed images was measured with a Macbeth TR927 densitometer and is given as the smear value.

Waterfastness Measurements: The image was soaked in tap water for a period of 5 minutes. The optical density of the image before and after soaking was measured and the waterfastness is the percent of the original optical density retained by the image after soaking.

EXAMPLE I

An ink composition was prepared as follows. In a bottle were combined deionized water (3.61 grams), "Dispersion A" (20.425 grams), prepared as described above, and ethylene glycol (6.0 grams), Caledon Laboratories Ltd. The pH was then adjusted to 7.03 using 1N aqueous NaOH. The ink was transferred to an empty black HP1600C cartridge and printed on the HP1600C printer. The printer drying mechanism was disabled before printing. The drying time of this ink was 1 minute on Xerox 4024 DP paper. The waterfastness was excellent at 97 percent with a smear value of 0.21.

EXAMPLE II

To the ink composition of Example I was added Surfynol 485 (1.0 gram), Air Products and Chemicals Inc., to provide an ink with a surface tension of 42.7 mN/m. The ink was transferred to an empty black HP1600C cartridge and printed on the HP1600C printer. The printer drying mechanism was disabled before printing. The drying time of this ink was 14 seconds on Image Series LX paper and 30 seconds on Xerox 4024 DP paper. The optical density of the image on paper was 1.41 with a waterfastness of 92 percent and a smear value of 0.16. Addition of the Surfynol provided a reduced drying time and an increase in smear resistance.

EXAMPLE III

An ink composition was prepared as follows. In a bottle were combined deionized water (3.61 grams), "Dispersion A" (20.425 grams) prepared as described above, and N-methyl pyrrolidinone (6.0 grams), Aldrich. The pH was then adjusted to 6.99 using 1N aqueous NaOH. Surfynol 485 (1.0 gram), Air Products and Chemicals Inc., was dissolved therein to provide an ink with a surface tension of 45.8 mN/m. The ink was transferred to an empty black HP1600C cartridge and printed on the HP1600C printer. The printer drying mechanism was disabled before printing. The drying time of this ink was 1 minute on Xerox 4024 DP paper. The waterfastness and smear were both excellent with values of 92 percent and 0.15, respectively.

EXAMPLE IV

An ink composition was prepared as follows. In a bottle were mixed deionized water (7.13 grams), "Dispersion A" (15.643 grams) prepared as described above, N-lauryl sarcosine (0.064 gram), Sigma, 1-cyclohexyl-2-pyrrolidinone (0.52 gram), triethanolamine (0.048 gram), Surfadone LP-300 (0.06 gram), ISP Technologies Inc., and sulfolane (6.028 gram), Philips Chemical. The resulting ink was submitted to 10 minutes of ultrasound, at setting 6, using sonicator model 350 available from Ultrasonic Inc., and filtered through a 1 micron GAF pre-filter. The ink was transferred to an empty black HP1600C cartridge and printed on the HP1600C printer. The printer drying mechanism was disabled before printing. The optical density on Image LX paper was 1.42 with an extremely low smear value of 0.07. Waterfastness was also excellent at 95 percent.

EXAMPLE V

An ink composition was prepared by adding 2-pyrrolidinone (1.94 grams) to a portion (16.03 grams) of the ink prepared in Example IV. The ink was transferred to an empty black HP1600C cartridge and printed on the HP1600C printer. The printer drying mechanism was disabled before printing. The optical density on Image LX paper was low at 1.2, but smear and waterfastness were both excellent.

EXAMPLE VI

An ink composition was prepared as follows. In a bottle were mixed deionized water (3.61 grams), "Dispersion A" (20.425 grams) prepared as described above, and 1,3-dimethyl-2-imidazolidinone (6.0 grams), Aldrich. The pH of this ink was measured as 7.08 and not adjusted. Surfynol 485 (1.0 gram), Air Products and Chemicals Inc., was dissolved therein to provide an ink with a surface tension of 46.8 mN/m. The ink was transferred to an empty black HP1600C cartridge and printed on this printer. The printer drying mechanism was disabled before printing. As in the above Example, the waterfastness and smear were both excellent, but the optical density was inferior to that in Examples I, II and IV.

Advantages of the invention inks include excellent waterfastness with values of 92 percent or greater. Image smear was reduced by the presence of the block copolymer which primarily functions as an adhesive for the carbon black on the paper. Amphiphilic diblock copolymers, such as polystyrene-b-poly(acrylic acid), act as steric stabilizers which minimize flocculation and aggregation of the carbon black particles over time, thereby enabling a very stable ink. The inks described in the above Examples showed no signs of settling after sitting on the shelf for several weeks. The inks have been demonstrated to be suitable for 600 spi printing and were produced using a scalable process.

Other embodiments and modifications of the present invention may occur to those of ordinary skill in the art subsequent to a review of the present application and the information presented herein; these embodiments and modifications, as well as equivalents thereof, are also included within the scope of this invention.

What is claimed is:

1. An aqueous ink jet ink composition comprising colorant, water, and an ($A_n$-$B_m$) block copolymer wherein n represents the degree of polymerization of A and m represents the degree of polymerization of B, wherein A is a polystyrene, a polybutadiene, or a polyisoprene, and B is a steric stabilizing block.

2. A composition in accordance with claim 1 wherein the degree of polymerization for A is from about 5 to about 50, and the degree of polymerization B is from about 70 to about 800.

3. An aqueous ink jet composition comprising colorant and ($A_n$-$B_m$) block copolymer wherein n is a number of from between about 5 to about 50, and A represents the anchoring block for said colorant, and B represents the block that functions primarily as a steric stabilizer, and wherein m is a number of from between about 70 and about 800, and wherein said A block is a polystyrene, a poly(alkylstyrene), a polyisoprene or a polybutadiene, and wherein the B block represents a polysulfonate, a polyphosphate, poly (quaternary ammonium salt), a poly(pyridinium salt), a polyphenoxide, a polycarboxylate or acrylic acid.

4. A composition in accordance with claim 3 wherein AB is polystyrene-b-poly(acrylic acid) with a degree of polymerization of from about 80 to 300.

5. A composition in accordance with claim 3 wherein AB is polystyrene-b-poly(acrylic acid) with from about 2 to about 30 percent of polystyrene and from about 98 to about 70 percent of poly(acrylic acid).

6. A composition in accordance with claim 3 wherein A is poly(alkyl styrene), poly(butadiene), poly(isoprene), or copolymers thereof; and the B block is a polycarboxylate or a poly(pyridinium salt).

7. A composition in accordance with claim 1 wherein said colorant is present in a concentration ranging from about 4 to about 10 percent by weight of said ink composition.

8. A composition in accordance with claim 1 wherein said colorant is carbon black.

9. A composition in accordance with claim 1 wherein said colorant particles have a particle size distribution where at least 70 percent of said particles have a diameter $\leq 0.1$ μm with the remaining particles having a diameter of less than 1.0 μm.

10. An ink jet composition consisting essentially of colorant and an ($A_n$-$B_m$, diblock polymer and wherein said ($A_n$-$B_m$) diblock is (styrene)$_{15}$-b-(acrylic acid)$_{150}$, (styrene)$_{10}$-b-(4-vinylpyridium)$_{200}$, (styrene-co-butadiene)$_{12}$-b-(styrene sulfonate)$_{160}$, (styrene-co-isoprene)$_{20}$-b-(4-vinylbenzoate)$_{300}$, or (t-butyl styrene)$_5$-b-(methacrylic acid)$_{120}$.

11. A composition in accordance with claim 1 with improved waterfastness and with reduced smear when selected for development.

12. A composition in accordance with claim 1 wherein said colorant is carbon black, and the ink is stable with respect to coalescence or aggregation of the colorant for about 1.5 years.

13. A composition in accordance with claim 11 wherein said waterfastness is from about 92 percent to about 99 percent, and said smear is less than about 0.17

14. An ink composition consisting essentially of pigment, water, and an ($A_n$-$B_m$) block copolymer wherein n represents the degree of polymerization of A and m represents the degree of polymerization of B wherein A is styrene, and B is acrylic acid.

15. An ink in accordance with claim 1 wherein there is provided a stable colorant dispersion of said colorant and said copolymer, and wherein said colorant is substantially free of flocculation or settling.

16. An ink in accordance with claim 1 wherein the AB block copolymer is selected in an amount of from about 15 to 40 weight percent on carbon black.

17. A composition in accordance with claim 1 wherein the degree of polymerization for A is from about 10 to about 20, and the degree of polymerization B is from about 150 to about 300.

18. An aqueous ink jet composition consisting essentially of colorant and an ($A_n$-$B_m$) block copolymer wherein n represents the degree of polymerization of A, and m represents the degree of polymerization of B, wherein A is polystyrene or polybutadiene, and wherein B is a polysulfonate, a polyphosphate, a poly(quaternary ammonium salt), a poly(pyridinium salt), a polycarboxylic, a polyphenoxide, or acrylic acid.

19. A composition in accordance with claim 18 wherein the number average molecular weight $M_n$ is from about 5,000 to about 100,000.

20. An ink in accordance with claim 18 wherein said copolymer is polystyrene-b-poly(acrylic acid).

* * * * *